Sept. 20, 1960     C. H. HERR, JR     2,953,035
GEAR SHIFT INTERLOCK AND DETENT MECHANISM
Filed Dec. 10, 1958     3 Sheets-Sheet 1

Inventor
Charles H. Herr Jr.
Attorney

Sept. 20, 1960     C. H. HERR, JR     2,953,035
GEAR SHIFT INTERLOCK AND DETENT MECHANISM
Filed Dec. 10, 1958     3 Sheets-Sheet 2

Inventor
Charles H. Herr Jr.
Attorney

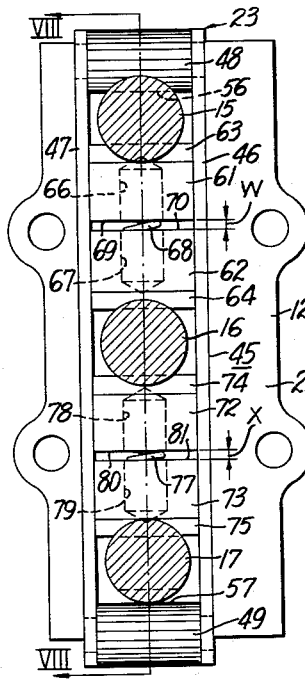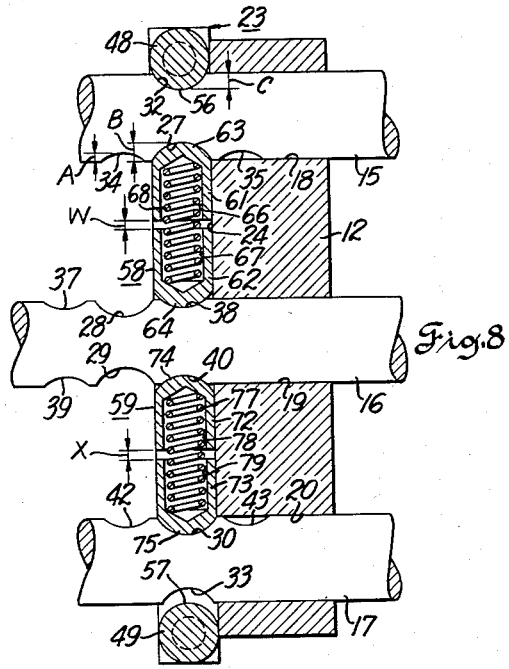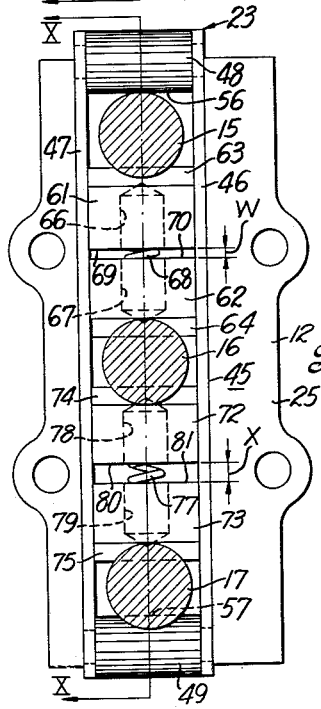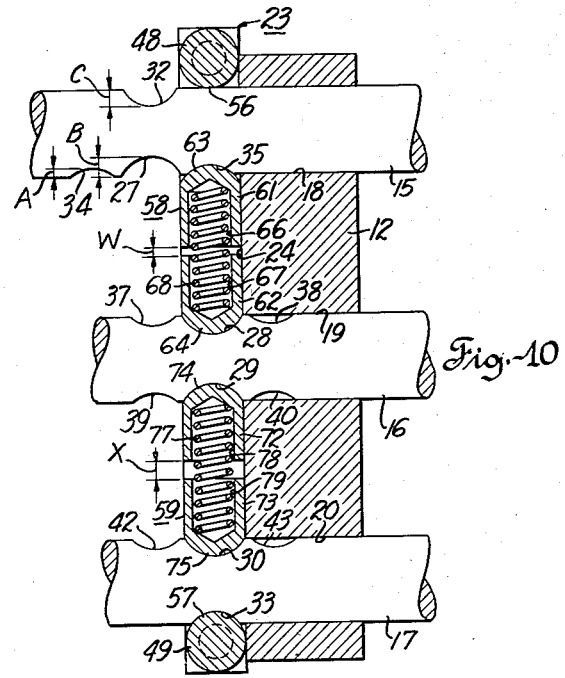

United States Patent Office 2,953,035
Patented Sept. 20, 1960

2,953,035

GEAR SHIFT INTERLOCK AND DETENT MECHANISM

Charles H. Herr, Jr., Springfield, Ill., assignor to Allis-Chalmers Manufacturing Company, Milwaukee, Wis.

Filed Dec. 10, 1958, Ser. No. 779,445

6 Claims. (Cl. 74—477)

This invention relates generally to a gear shifting device for a change speed transmission and the like and is more particularly concerned with an interlock and detent mechanism for reciprocable shift rods.

In automotive type vehicles having transmissions wherein axially reciprocable shift rods are used to shift the gears in order to effect a speed change or a reverse drive it is necessary to provide a suitable device to prevent the shiftable gears from accidentally moving out of their preselected positions. Accidental shifting is apt to occur particularly during operation under conditions that cause a sudden impact to the vehicle thereby tending to jar the gears out of their preselected positions. It is, of course, well known that accidental shifting of transmission gears may result in serious damage to the entire transmission and in order to prevent such accidental shifting various types of interlock and detent mechanisms have been suggested. The conventional mechanisms adapted to accommodate a group of three shift rods have required a multiplicity of parts in order to combine the function of detent and interlock, this contributes to the cost of manufacture and unnecessarily complicates the assembly and disassembly.

It is, therefore, an object of the present invention to provide an improved interlock and detent mechanism which is entirely reliable and which will overcome the objections and meet the requirements hereinbefore outlined in a completely satisfactory manner.

It is another object of the present invention to provide an interlock for the two outside shift rods of a group of three by providing a yoke member fitting about all three of the shift rods whereby axial shifting of one of said rods will be prevented by the yoke member when the other of the outside rods is shifted out of the neutral position.

It is a further object of the present invention to provide a unitary interlock mechanism for a group of three shift rods wherein movement of any two of the shift rods will be prevented upon shifting of the third shift rod.

Another object of the present invention is to provide a detent and interlock mechanism for releasably maintaining the group of three shift rods in a neutral position and automatically prevent shifting of any two of the shift rods out of neutral upon shifting of one of the shift rods.

These and other objects and advantages of the present invention will become apparent to those skilled in the art when the following description is read in conjunction with the appended drawings in which:

Fig. 7 is a view of the interlock and detent mechanism similar to Fig. 2 but showing the position of the locking elements when the middle shift rod is moved to the left into an operating position;

Fig. 8 is a sectional view taken along section lines VIII—VIII in Fig. 7;

Fig. 9 is a view similar to Fig. 2 but showing the position of the locking elements when the top shift rod is moved to the left into an operating position; and Fig. 10 is a sectional view taken along lines X—X in Fig. 9.

Figure 1:
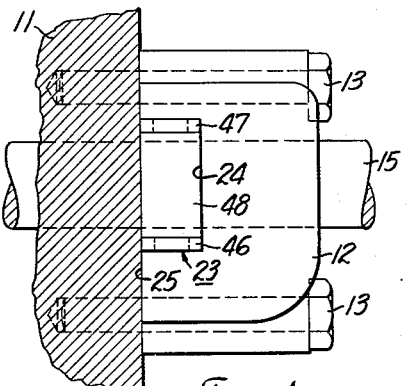
Fig. 1 is a top view of a detent and interlock mechanism for a group of three shift rods which is assembled with a transmission housing, only a fragmentary portion of the latter being shown.
Figure 2:
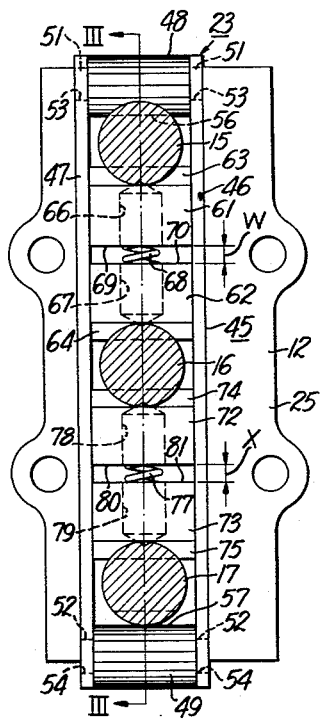
Fig. 2 is a view of the side of the detent and interlock mechanism that abuts the transmission housing in the assembled condition, as shown in Fig. 1, and illustrates the position of the locking elements when all of the shift rods are in their respective neutral positions.
Figure 3:
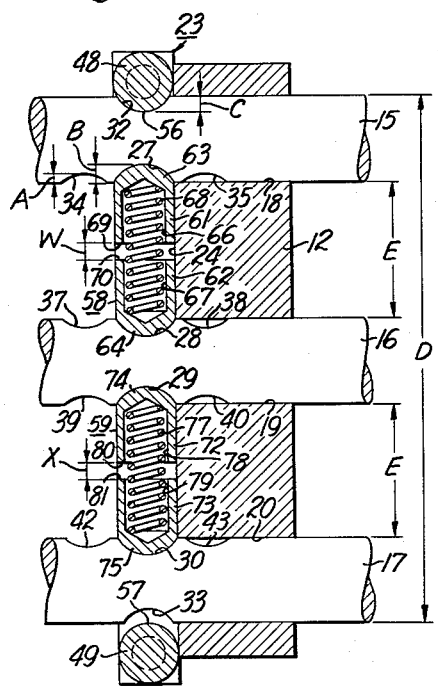
Fig. 3 is a sectional view of the interlock and detent mechanism taken along section line III—III in Fig. 2.

Referring to Figs. 1 through 10, the transmission housing, a fragmentary portion of which is shown in Fig. 1, being indicated generally by reference numeral 11, together with detachable housing 12, which is attached to housing 11 by means of cap screws 13, provides a support for the axially reciprocable shift rods 15, 16 and 17 which are suitably journaled respectively in bores 18, 19 and 20 formed in the support. Rods 15 and 17 are the outside shift rods of the group of three being laterally spaced from the center shift rod 16, all are coplanar and are disposed in spaced parallel relationship with each other. The interlock and detent mechanism, indicated generally by the reference numeral 23, is carried in a channel 24 formed in the face 25 of housing 12 adjacent to transmission housing 11 and extends along an axis transversely of and intersecting bores 18, 19 and 20. Mechanism 23 includes recesses or notches 27, 28, 29 and 30 which are provided respectively on opposite adjacent surfaces of rods 15, 16 and 17 extending transversely thereof and correspond to the intermediate neutral position of the shift rods. A pair of locking recesses also corresponding to the neutral position are provided respectively on the surfaces of rods 15 and 17 remote from each other. Recesses 34 and 35 correspond to predetermined operating positions and are formed respectively at opposite sides of recess 27 of shift rod 15. Recesses 37 and 38 which correspond respectively to predetermined operating positions are formed on either side of recess 28, and recesses 39 and 40 which correspond to shifted positions are formed respectively on either side of recess 29 in the shift rod 16. Recesses 42 and 43 which correspond to predetermined operating positions are formed respectively on either side of recess 30 of shift rod 17. Recesses 34, 35, 37, 38, 39, 40, 42 and 43 which correspond respectively to operating positions extend transversely of the respective shift rods and are of equal radial depth below the surface of the shift rods which depth is indicated by the reference character A, shown in Figs. 3, 5, 8 and 10; recesses 27, 28, 29 and 30 which correspond to neutral positions are also of an equal radial depth below the surface of shift rods 15, 16 and 17 which depth is indicated by reference character B, shown in Figs. 3, 5, 8 and 10, and which is deeper than depth A. Locking recesses 32 and 33 are also of equal radial depth below the surface which depth is indicated by the reference character C, shown in Figs. 3, 5, 8 and 10. The interlock and detent mechanism 23 also includes a yoke member 45 which has a longitudinal axis extending transversely of the shift rods. Yoke 45 is slidably mounted in channel 24 and includes a pair of thrust transmitting elements or straps 46 and 47 which in the assembled condition extend longitudinally at opposite lateral sides respectively of the shift rods, being juxtaposed respectively with the sides of the channel 24. A pair of cylindrical cross members 48 and 49 are respectively positioned, in the assembled condition, adjacent locking recesses 32 and 33. Members 48 and 49 serve as connecting means between straps 46 and 47 being assembled therewith by means of studs 51 and 52 projecting axially at opposite ends respectively of members 48 and 49 being received respectively into bores 53 and 54 provided in the opposite ends of straps 46 and 47. Members 48 and 49 have engaging portions 56 and 57 which are complementary to and registrable respectively with locking recesses 32 and 33. The distance between engaging portions 56 and 57 of the cylindrical connecting members 48 and 49 being slightly larger than the distance between the surfaces of shift rods 15 and 17 remote from each other, which distance is indicated by reference character D (shown in Fig. 3), minus the depth C of a locking recess or in other words is approximately equal to the distance D minus C. A first and second detent means, indicated generally by reference characters 58 and 59, respectively, are slidably mounted between straps 46 and 47 for movement along the longitudinal axis of yoke 45. First detent means 58 is positioned between shafts 15 and 16 and includes separate locking elements 61 and 62. Element 61 has an outer end portion 63 complementary to and selectively engageable with recesses 27, 34 and 35 in shaft 15. Element 62 has an outer end portion 64 complementary to and selectively engageable with recesses 28, 37 and 38 in shaft 16. Elements 61 and 62 are provided with coaxial bores 66 and 67 for receiving a helical compression spring 68 which acts therebetween and urges expansion of pair 58 in a direction tending to separate them thereby yieldably maintaining outer end portions 63 and 64, respectively, in one of the recesses. A pair of abuttable flat portions 69 and 70 are provided respectively on opposite inner surfaces of elements 61 and 62 which limits the minimum contracted distance between the outer end portions 63 and 64 which contracted distance is slightly less in length to the distance E between opposite adjacent surfaces of shift rods 15 and 16, as shown in Fig. 3, plus the depth B of one of the recesses corresponding to the neutral position or in other words is approximately equal to the distance A plus E. The second detent means 59 is identical in construction and assembly to the first detent means 59 and includes a pair of elements 72 and 73, respectively, having outer end portions 74 and 75, respectively, complementary to and engageable with recesses 29, 39 and 40 in rod 16 and with recesses 30, 42 and 43 in rod 17; a helical compression spring 77 having opposite ends received in coaxial bores 78 and 79; and also includes abuttable inner flat portions 80 and 81. The minimum contracted distance between the outer end portions 74 and 75 is equal in length to slightly less than the distance E between adjacent surfaces of rods 16 and 17 plus the depth B of one of the recesses corresponding to the neutral position or in other words is approximately equal to the distance E plus B, as shown in Fig. 3.

Although no mechanism has been illustrated for shifting or actuating the rods, it is to be understood that any suitable mechanism for selectively shifting the individual shift rods alternatively may be employed of which there are several types all well known in the art.

*Operation*

Referring to Figs. 2 and 3, shift rods 15, 16 and 17 are shown in their respective neutral positions wherein outer portions 63 and 64 of the locking elements 61 and 62 are biased into registration respectively with recesses 27 and 28 by the effort exerted by spring 68; and outer portions 74 and 75 of locking elements 72 and 73 are biased respectively into recesses 29 and 30 by the effort exerted by spring 77. Engaging portion 56 of member 48 is in registration with locking recess 32 being held therein by gravity acting on yoke 45, and it will be readily apparent that axial movement of either one or the other of rods 15 and 17 will not be prevented by yoke 45. Since the distance W between abuttable portions 69 and 70 is slightly greater than the depth B of either of recesses 27 or 28 and since distance X between the flat abuttable portions 80 and 81 is slightly greater than depth B of either of recesses 29 or 30, any one of the rods 15, 16 and 17 may be alternatively shifted to either the left or right into an operating position from the neutral position. Considering the neutral condition from the general point of view, both pairs of locking elements 58 and 59 including springs 68 and 77 and recesses 27, 28, 29 and 30 serve as a detent means for releasably maintaining shift rods 15, 16 and 17 in a neutral position.

Figure 4:
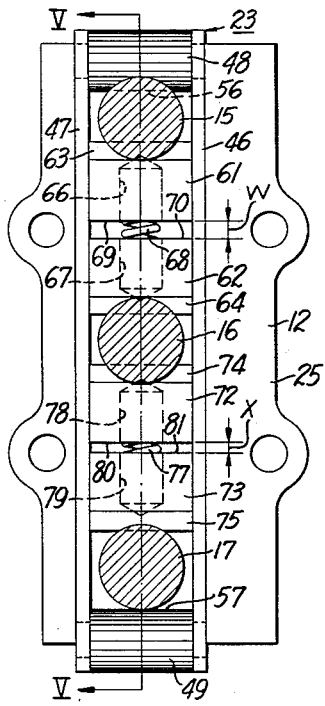
Fig. 4 is a view of the mechanism similar to Fig. 2 but illustrating the position of the locking elements when the lower shift rod is moved to the left into an operating position.
Figure 5:
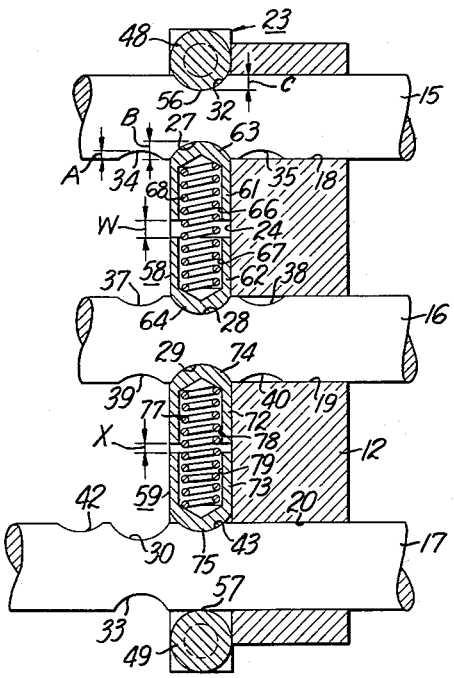
Fig. 5 is a sectional view of the mechanism taken along lines V—V in Fig. 4.
Figure 6:
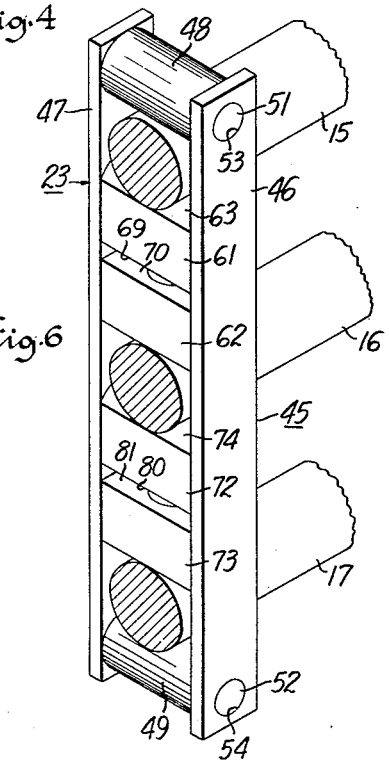
Fig. 6 is a perspective view of the yoke and both pairs of locking elements which have been removed as a package from the housing and which are engaged with the shift rods, only fragmentary portions of the latter being shown.

Referring to Figs. 4 and 5, shift rods 15 and 16 are shown in a neutral position with the bottom shift rod 17 being shifted to the left, as viewed best in Fig. 5, into a predetermined operating position. In this condition the top shift rod 15 is locked from movement due to engaging portion 56 being maintained in locked relationship with locking recess 32 by straps 46 and 47 and engaging portion 57 which abuts against the outer surface of rod 17 thereby preventing insufficient longitudinal movement of yoke 45 to release portion 56. Also, in this condition shift rod 16 is locked from movement since the distance X between abuttable portions 80 and 81 is less than depth B of recess 29; and therefore, outer portion 74 is maintained in cooperative engagement with recess 29 of rod 16. Shift rod 17 is releasably retained in the shifted position since the distance X is slightly greater than depth A of recess 43 and outer end portion 75 is yieldably maintained in registration with recess 43. Considering this shifted condition from a general point of view, locking elements 72 and 73 and recess 29 serve as an interlock between the lower rod 17 the rod 16 to prevent movement of the latter from neutral position upon movement of the lower rod into an operating position. Yoke 45 including member 48 and recess 32 serves as an interlock between the outer shift rods 15 and 17 to prevent movement out of neutral position of the former upon movement of the latter out of neutral position. At the same time recess 43 and the second pair of locking elements 59 including spring 77 serve as a detent means for releasably retaining rod 17 in its leftward operating position. It will be noted further that the same interlock and detent condition will prevail should shift rod 17 be shifted to the right out of neutral and into a predetermined operating position whereby outer portion 75 will be in registration with recess 42.

Referring now to Figs. 7 and 8, outer shift rods 15 and 17 are shown in their respective neutral positions and center shift rod 16 is moved to the left out of neutral and into a predetermined operating position. Shift rod 15 is locked from movement in a neutral position due to the distance W between the abutting portions 69 and 70 being less than depth B of recess 27 whereby outer portion 63 is maintained in cooperative registration with recess 27. Shift rod 17 is also locked from axial movement in the neutral position because the distance X between the abuttable flat portions 80 and 81 is less than depth B of recess 30 whereby outer end portion 75 is maintained in cooperative locking registration with recess 30. Since the distance W between the flat abuttable portions 69 and 70 and since distance X between the abuttable portions 80 and 81 are respectively slightly greater than depth A of recess 38 and 40, outer end portions 64 and 74 of locking elements 62 and 72 are yieldably maintained respectively in recesses 38 and 40 whereby rod 16 is releasably retained in the operating position. Considering this shifted condition from the general point of view first pair of locking elements 58 and recess 27 serve as an interlock between rods 15 and 16 whereby movement of the former out of neutral position is prevented upon movement of the latter out of neutral position. Second pair of locking elements 59 and recess 30 serve as an interlock between rods 16 and 17 whereby movement of the latter out of neutral is prevented upon movement of the former out of neutral into the operating position. Both pairs of locking members including helical springs 68 and 77 and recesses 38 and 40 serve as a detent for releasably retaining rod 16 in the operating position. It will be noted also that the same interlock and detent condition will prevail upon movement of center rod 16 to the right out of neutral into the predetermined operating position wherein outer portions 64 and 74 of elements 62 and 72 would be maintained in yieldable registration respectively with recesses 37 and 39.

Referring to Figs. 9 and 10, shift rod 15 has been shifted to the left into a predetermined operating position and shift rods 16 and 17 are retained in their respective neutral positions. Shift rod 17 is locked from movement out of the neutral by yoke 45. Engaging portion 56 of member 48 is in abutting relationship with the outer surface of shift rod 15 whereby engaging portion 57 of member 49 is retained in locking engagement with locking recess 33. Shift rod 16 is locked from movement in the neutral position by the first pair of locking elements 58 due to the distance W between the abuttable portions 69 and 70 being less than depth B of recess 28 whereby outer portion 64 is maintained in cooperative locking engagement with recess 28 of rod 16. Since distance W is slightly greater than depth A of recess 35, engaging portion 56 of cross member 48 rides on the outer surface of shift rod 15; and end portion 63 is yieldably maintained in recess 35 by spring 68; rod 15 is releasably retained in the leftward operating position. Considering this shifted condition from the general point of view, it will be seen that locking elements 61 and 62 and recess 28 serve as an interlock between rods 15 and 16 whereby movement of the latter is prevented upon movement of the former out of neutral position. Yoke member 45 and locking recess 33 serve as an interlock between the outer rods 15 and 17 whereby movement of the latter out of neutral is prevented upon shifting of the former out of neutral position. Locking elements 61 and 62 including coil spring 68 and recess 35 serve as a detent means for releasably retaining rod 15 in the predetermined leftward operating position. It will also be noted that a similar interlock and detent relationship will prevail should the shift rod 15 be moved to the right out of neutral into a predetermined operating position wherein the outer end portion 63 of element 61 would be disposed in yieldable registration with recess 34.

From the foregoing detailed description it will be readily seen that a new and improved interlock mechanism has been illustrated for the two outside shift rods of a group of three, as well as an interlock between the center rod and both of the outside shift rods wherein movement of any one of the rods out of neutral will prevent movement of the remaining two out of the neutral. Also a detent means is provided which is operative to releasably maintain each of the three shift rods in a neutral position or any one of the rods in a predetermined operating position. It will be noted further that the components of the hereinbefore described interlock and detent mechanism are extremely simple in construction and are few in number which will result in a substantial saving in their cost of manufacture and facilitate their assembly into an operating package.

It should be understood that although only one embodiment of the present invention has been illustrated and described in detail it is not intended to limit the invention to the particular form herein otherwise than is necessitated by the scope of the appended claims.

What is claimed is:

1. In combination with first and third shift rods disposed respectively on opposite sides of a second shift rod, said rods being parallel, coplanar and individually axially slidable on a support, an interlock and detent mechanism for said shift rods comprising: a yoke means fitting around all three of said shift rods and being slidably mounted on said support for reciprocable movement on an axis extending perpendicular to the axes of said shift rods, a locking recess formed on the sides of said first and third rods remote from each other, said locking recesses being adapted to receive adjacent portions of said yoke means in cooperative locking engagement, other recesses respectively formed on the sides of said shift rods adjacent to each other, and a first and second axially expansible and contractible detent means respectively interposed between said first and second and said second and third shift rods, said detent means being axially aligned on the axis of said yoke means and being confined by said yoke means against lateral displacement with respect to the plane of said shift rods, means for maintaining said detent means against displacement axially of said shift rods, and resilient means respectively for urging expansion of said detent means into cooperative engagement with the recesses on adjacent sides of the shift rods.

2. In combination with first and third shift rods disposed respectively on opposite sides of a second shift rod, said rods being parallel, coplanar and individually axially slidable on a support from a neutral position into predetermined shifted positions, an interlock and detent mechanism for said shift rods comprising: a rectangular yoke means fitting around all three of said shift rods and being slidably mounted on said support for reciprocable movement on an axis extending perpendicular to the axes of said shift rods, said yoke means including a pair of end portions respectively positioned adjacent the surfaces of said first and third shift rods remote from each other and also including a pair of side members disposed parallel to said axis and interconnecting said end portions, a locking recess formed on said sides of the first and third rods remote from each other, said locking recesses being adapted to receive said end portions of the yoke means, first recesses respectively formed on the sides of said shift rods adjacent to each other, a first and a second axially expansible and contractible detent means respectively interposed between said first and second and said second and third shift rods, said detent means being slidably carried between said side members and axially aligned on the axis of said yoke means, means for maintaining said detent means against displacement axially of said rods and resilient means respectively for urging expansion of said detent means into cooperative engagement with said first recesses on adjacent shift rods.

3. The combination set forth in claim 2 including other recesses on said adjacent sides of the shift rods, one of said other recesses being spaced from and on each side of each of said first recesses, and wherein said first recesses when aligned on the axis of said yoke means determine said neutral position of the shift rods and said other recesses when aligned on said axis determine said shifted position of the shift rods.

4. In combination with a support and first and third shift rods disposed respectively on opposite sides of a second shift rod, said rods being parallel and coplanar, and being individually axially slidable from an intermediate neutral position into either of two operating positions, an interlock and detent mechanism for said shift rods comprising: a rectangular yoke means fitting around all three of said shift rods and being slidably mounted on said support for reciprocable movement on an axis extending perpendicular to the axes of said shift rods, said yoke means including a pair of end portions respectively positioned adjacent said first and third shift rods and also including a pair of side members interconnecting said end portions, a locking recess formed on the sides of each of said first and third rods remote from each other, said locking recesses extending transversely of said rods and being adapted to receive said end portions in coextensive cooperative registration, first recesses respectively formed on the sides of said shift rods adjacent to each other and extending transversely of the rods, a first and a second axially expansible and contractible detent means respectively interposed between said first and second and said second and third shift rods, each of said detent means including a pair of locking elements and being slidably carried between said side members of the yoke means in axial alignment on the axis of said yoke means, each of said elements having an end portion complementary to and coextensive with an adjacent first recess, resilient means interposed between each of said pair of locking elements for urging expansion of the pair of elements into cooperative registration respectively with the recesses on adjacent shift rods thereby releasably retaining the shift rods in a neutral position, and means for maintaining said detent means against displacement axially of said shift rods.

5. The combination set forth in claim 4 wherein the distance between the nearest points of said end portions of the yoke means being at least equal to the distance between the surfaces of said first and third shift rods remote from each other minus the depth of one of said locking recesses; and wherein the maximum contracted axial length of each of said detent means being not more than the distance between opposite adjacent surfaces of said second and third shift rods plus the depth of one of said first recesses.

6. The combination set forth in claim 5 including other recesses formed on the opposite adjacent surfaces of and extending transversely of said shift rods, said other recesses corresponding to the predetermined shifted positions of said shift rods, one of said other recesses being spaced axially of said rods on each side of said first recesses and being adapted to receive said locking elements in complementary registration, and wherein said first recesses have a greater depth below the surface of the rods than said other recesses.

References Cited in the file of this patent

UNITED STATES PATENTS

| | | |
|---|---|---|
| 882,091 | Balloco | Mar. 17, 1908 |
| 1,081,763 | Meyers | Dec. 16, 1913 |
| 1,317,191 | Jensen | Sept. 30, 1919 |
| 2,351,485 | Conkle | June 13, 1944 |
| 2,847,871 | Schick | Aug. 19, 1958 |
| 2,878,908 | Winkleman | Mar. 24, 1959 |

FOREIGN PATENTS

| | | |
|---|---|---|
| 1,016,997 | Germany | Oct. 3, 1957 |